US007573222B2

(12) United States Patent
Sumiya et al.

(10) Patent No.: US 7,573,222 B2
(45) Date of Patent: Aug. 11, 2009

(54) MOTOR CONTROL APPARATUS

(75) Inventors: Takahiro Sumiya, Toyohashi (JP); Tatsuya Suzuki, Kosai (JP); Hiroyuki Furukoshi, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/455,852

(22) Filed: Jun. 20, 2006

(65) Prior Publication Data

US 2006/0290310 A1 Dec. 28, 2006

(30) Foreign Application Priority Data

Jun. 28, 2005 (JP) ............... 2005-188432

(51) Int. Cl.
*G05D 23/00* (2006.01)
(52) U.S. Cl. .............. 318/471; 318/473; 318/783
(58) Field of Classification Search .............. None
See application file for complete search history.

(56) References Cited

U.S. PATENT DOCUMENTS 5,323,287 A 6/1994 Peter
5,351,439 A * 10/1994 Takeda et al. ............ 49/28
5,663,620 A * 9/1997 Mizuno et al. ........... 318/283
6,055,819 A * 5/2000 Kang ..................... 62/184
6,897,782 B2 * 5/2005 Heinrich et al. .......... 340/588
7,400,338 B2 * 7/2008 Yano .................... 347/243

FOREIGN PATENT DOCUMENTS

JP A-11-164472 11/1997

* cited by examiner

*Primary Examiner*—Walter Benson
*Assistant Examiner*—Renata McCloud
(74) *Attorney, Agent, or Firm*—Posz Law Group, PLC

(57) ABSTRACT

A motor control apparatus for controlling an operation of an electric motor has an operational temperature estimator and an operation controller. The operational temperature estimator estimates an estimated temperature of the electric motor. The operation controller disables to start the operation of the electric motor while the estimated temperature is within a predetermined operation start disable range, and enables to continue the operation of the electric motor when the estimated temperature increases into the operation start disable range.

11 Claims, 4 Drawing Sheets

MOTOR CONTROL APPARATUS

CROSS REFERENCE TO RELATED APPLICATION

This application is based upon and claims the benefit of priority of Japanese Patent Application No. 2005-188432 filed on Jun. 28, 2005, the content of which is incorporated herein by reference.

FIELD OF THE INVENTION

The present invention relates to a motor control apparatus for controlling an operation of an electric motor that performs a continuous set operation for a certain time.

BACKGROUND OF THE INVENTION

Conventionally, motors are integrally provided with protective devices such as a bimetal, a PTC (positive temperature coefficient) device, etc. If the motor generates heat extraordinarily during its operation, a certain condition of device temperature, device resistance, etc. are satisfied for the protective devices to break an electric circuit of the electric motor. Thus, the electric motor stops being energized, to be prevented from being burnt.

However, when the above-mentioned protective device is located in a proximity to a main body of the electric motor, a size of the electric motor increases, to upsize an entire body of an apparatus provided with the motor. JP-11-164472-A discloses a motor control apparatus that calculates an estimated temperature of the motor without being provided with the above-mentioned protective device. Specifically, the motor control apparatus includes a control unit for controlling the motor that calculates an estimated temperature of the motor by using an energizing voltage and time applied to the motor, and a previously estimated temperature.

The motor control apparatus according to JP-11-164472-A stops the operation of the motor when the estimated temperature becomes equal to or larger than a predetermined overheat prevention temperature. The motor control apparatus keeps stopping the operation of the motor until the estimated temperature decreases to an overheat prevention release temperature.

However, the above-mentioned protective devices are used to prevent the motor from being burnt, the motor control apparatus can forcedly stop the operation of the motor if the protective device satisfies a certain condition. The motor control apparatus according to JP-11-164472-A forcedly stops the operation of the motor once the estimated temperature exceeds the overheat protection temperature.

Thus, in such a case that the motor is forcedly stopped while the motor is driving a power window apparatus to its closing side in an automatic mode, the window glass is stopped at a middle position before it completely closes at a full close position. That is, the motor control apparatus has an incommodity to stop the operation before completing a continuous set operation such as a closing operation of the power window apparatus.

In this case, the window glass is stopped at the half-open middle position even when a driver or a passenger attempts to close the window glass fully in parking the vehicle. In a case that the power window apparatus is provided with a pinch-free function, the window glass can keep pinching a hand, etc., when the motor of the power window apparatus is forcedly stopped.

SUMMARY OF THE INVENTION

The present invention is achieved in view of the above-described issue, and has an object to provide a motor control apparatus for controlling an operation of an electric motor that prevents the electric motor from being burnt without interrupting a continuous set operation of the electric motor.

The motor control apparatus has; an operational temperature estimator that estimates an estimated temperature of the electric motor; and an operation controller that disables to start the operation of the electric motor while the estimated temperature is within a predetermined operation start disable range and enables to continue the operation of the electric motor when the estimated temperature increases into the operation start disable range.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
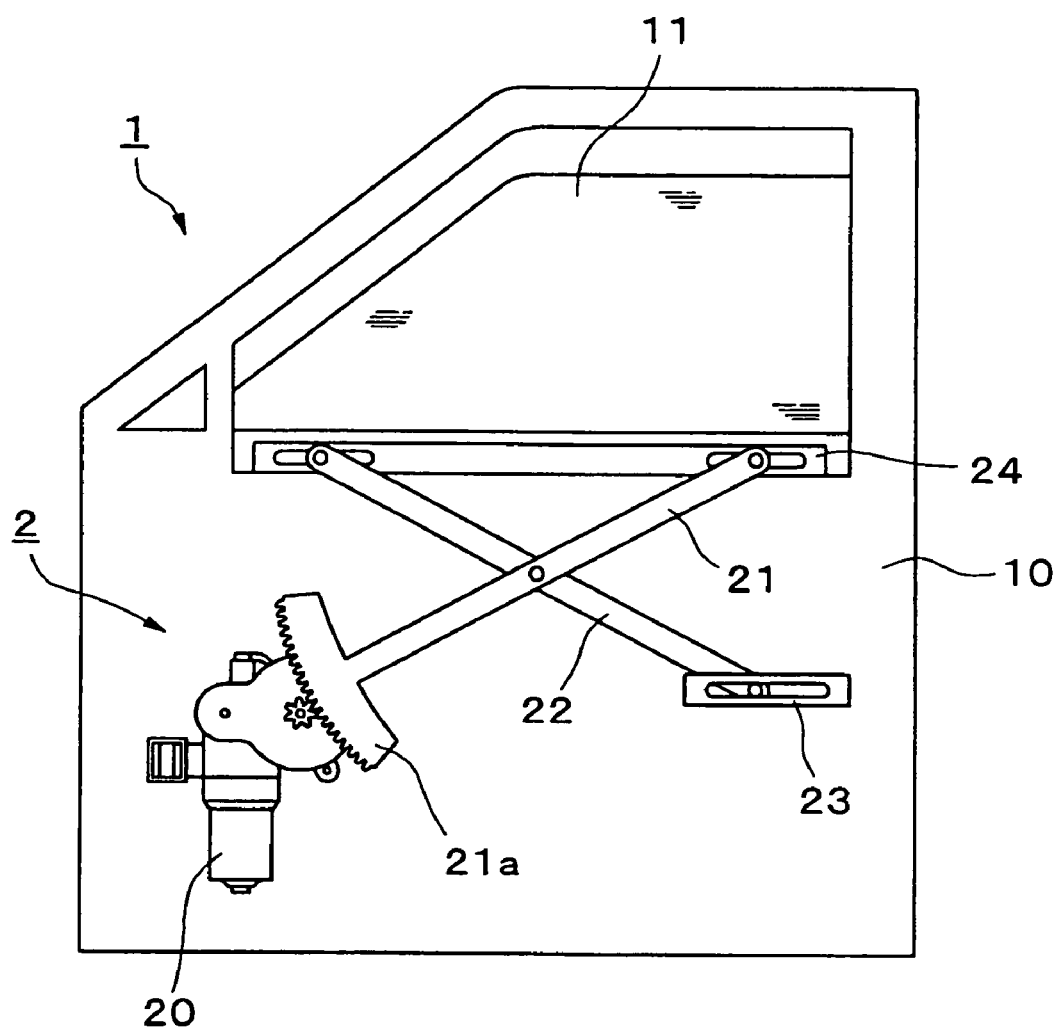
FIG. 1 is a diagram schematically showing a power window apparatus provided with a motor control apparatus according to an embodiment of the present invention.
Figure 2:
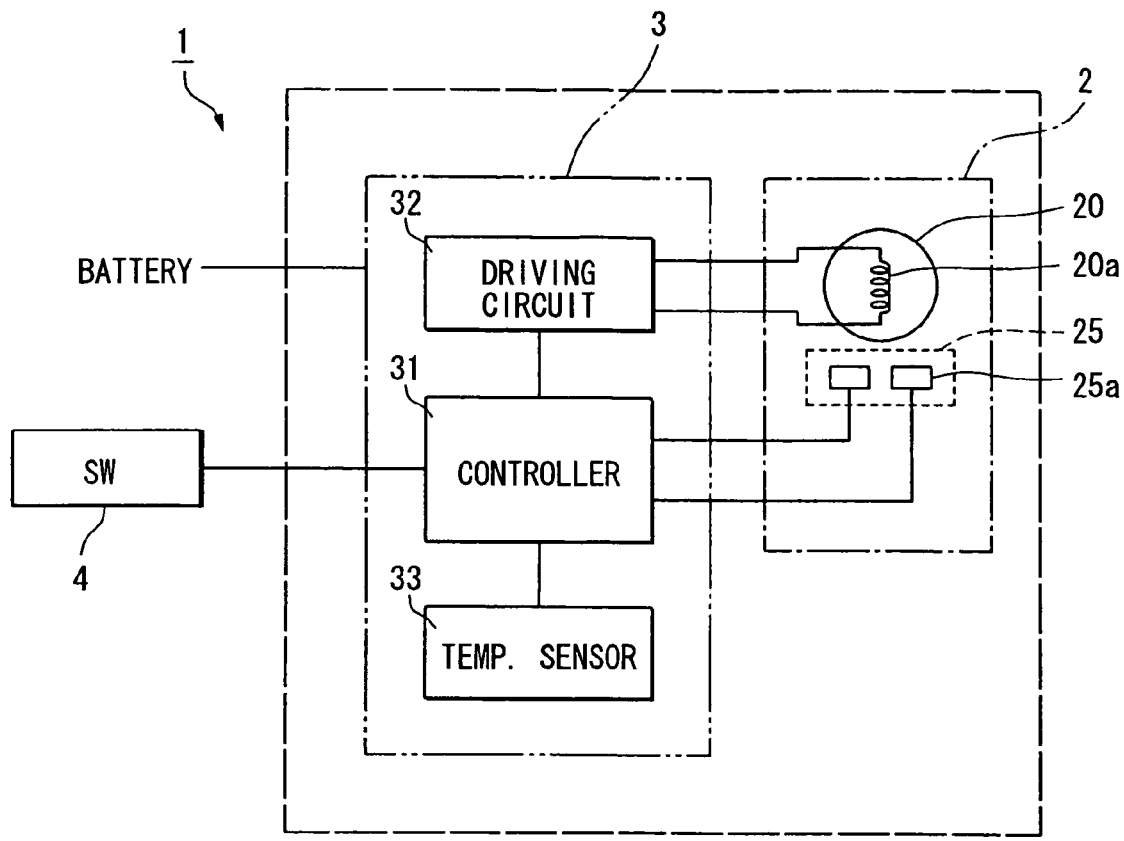
FIG. 2 is a block diagram schematically showing an electrical construction of the power window apparatus provided with the motor control apparatus according to the embodiment.

In the following is described a motor control apparatus according to an embodiment of the present invention, which is applied to a power window apparatus of a vehicle. FIG. 1 schematically depicts a construction of the power window apparatus 1. FIG. 2 schematically depicts an electrical construction of the power window apparatus 1. The power window apparatus 1 is for moving up and down (closing and opening) a window glass 11, which is a moving member installed in a vehicular door 10, by rotationally driving an electric motor 20. The power window apparatus 1 has main components including: an elevating mechanism 2 that drives the window glass 11 to open and close; a control unit 3 that controls an operation of the elevating mechanism 2; and an operating switch 4 with which a driver or a passenger switches.,the operation of the power window apparatus 1.

The window glass 11 moves up and down along a rail (not shown) between a full open position and full close position.

The elevating mechanism 2 has main components including: an electric motor 20 that is fixed on the door 10 and has a speed reducing mechanism; an elevator arm 21 that has a generally fan-shaped gear 21a to be driven by the electric motor 20; a sub arm 22 that is crossed with and pivotally supported by the elevator arm 21; a fixed channel 23 that is fixed on the door 10; and an on-glass channel 24 that is integrally fixed on the window glass 11.

The electric motor 20 has such a construction that a coil 20a of its rotor is energized when it is supplied with electric power from the control unit 3, thereby generates magnetically attracting action between the rotor and a stator provided with a magnet so as to rotate the rotor in a normal and a reverse directions. In the elevating mechanism 2, when the elevator arm 21 and the sub arm 22 wring in accordance with a rotation of the electric motor 20, both end portions of each of the elevator arm 21 and the sub arm 22 are slidably supported by the channels 23, 24. Thus, the elevating mechanism 2 acts as an X link to move the window glass 11 up and down.

The electric motor 20 is integrally provided with a rotation detection device (position detection device) 25, which sends pulse signals synchronized with the rotation of the electric motor 20 to the control unit 3. The rotation detection device 25 has a construction to detect a magnetism variation of a magnet, which rotates together with an output shaft of the electric motor 20, by a plurality of Hall devices 25a.

The control unit 3 calculates an elevating position of the window glass 11 with the pulse signals. The control unit 3 can calculate a rotational speed of the electric motor 20 and a moving speed of the window glass 11, which corresponds with the rotational speed of the electric motor 20, by using intervals of the pulse signals.

In this embodiment, Hall devices serve the rotation detection device 25, however the rotation detection device 25 is not limited to Hall devices provided it can detect the rotational speed of the electric motor 20. For example, an encoder can serve the rotation detection device 25. Further, the electric motor 20 according to this embodiment is integrally provided with a rotation detection device 25 to detect the rotational speed of the output shaft of the electric motor 20, which is in accordance with the motion of the window glass 11. However, the present invention is not limited to this construction. For example, a moving speed of the window glass 11 may be detected by using the other conventional means.

The control unit 3 has a controller 31, a driving circuit 32, a temperature sensor 33, etc., which are arranged on a circuit board. A battery on a vehicle supplies electric power to the controller 31, the driving circuit 32, the temperature sensor 33, etc. as demanded.

The controller 31 is formed from a microcomputer provided with a CPU, a ROM, a memory device such as RAM, an input circuit, an output circuit, etc. The CPU is connected with the memory device, the input device and the output device via a bus.

In a normal operation time, the controller 31 controls the electric motor 20 to rotate in the normal and reverse directions via the driving circuit 32 based on operation signals sent from the operating switch 4, so as to open and close the window glass 11. The controller 31 receives the pulse signals from the rotation detection device 25, and detects a pinching of a foreign matter between an upper end portion of the window glass 11 and a window frame, in accordance with the pulse signals. When the controller 31 detects a pinching of a foreign matter, the controller 31 controls the electric motor 20 to rotate to an opening side to open the window glass 11, via the driving circuit 32. In this manner, the controller 31 according to this embodiment acts as an operation reversing means.

The driving circuit 32 is formed from an IC having a FET (field-effect transistor), and switches a polarity of electric power supplied to the electric motor 20 in accordance with control signals from the controller 31. That is, the driving circuit 32 supplies electric power to the electric motor 20 so as to rotate the electric motor 20 in the normal direction when it receives a normal rotation command signal from the controller 31, and so as to rotate the electric motor 20 in the reverse direction when it receives a reverse rotation command signal from the controller 31. The driving circuit 32 may have a construction to switch the polarity with a relay circuit. The driving circuit 32 may be incorporated in the controller 31.

The temperature sensor 33 detects an ambient temperature in a proximity to the circuit board on which the controller 31, etc. are arranged. In this embodiment, the temperature sensor 33 is located apart from the electric motor 20.

The controller 31 receives ambient temperature detection signals from the temperature sensor 33, and then calculates the ambient temperature in the proximity to the circuit board based on the ambient temperature detection signals. Further, the controller 31 counts a voltage and time of an electric power applied to the electric motor 20 via the driving circuit 32. The controller 31 further monitors the rotational speed and the energizing state of the electric motor 20 by using the pulse signals from the rotation detection device 25.

The energizing state here refers to: a normal operational state in which the electric motor 20 moves up and down the window glass 11 in a normal operational action; or a motor stuck state in which the window glass is immovably kept at the full open position or at the full close position by the window frame, etc., for a predetermined motor stuck time. In this regard, a temperature increasing pace is larger in the motor stuck state than in the normal operational state, because the electric motor 20 is subjected to a larger load in the motor stuck state in which the window glass 11 is at the full open position or at the full close position than in the normal operational state.

The controller 31 memorizes a reference data for calculating the estimated temperature of the coil 20a. The controller 31 calculates the estimated temperature of the coil 20a, based on this reference data together with the ambient temperature, the applied voltage, the energizing time, the rotational speed, the energizing state, etc. The controller 31 in this embodiment corresponds to the operational temperature estimator according to the present invention. In this embodiment, the controller 31 calculates the estimated temperature of the coil 20a, however, the present invention is not limited to this configuration. For example, the controller 31 may be configured to detect an estimated temperature of an entire of the electric motor 20.

The controller 31 stops the power supply from the driving circuit 32 in accordance with the estimated temperature, so as to prevent the coil 20a from being burnt. In this manner, the power window apparatus 1 according to this embodiment stops electric power supply, in accordance with the estimated temperature of the coil 20a that is calculated by the controller 31, so as to prevent the coil 20a from being burnt. In this embodiment, it is not necessary to install a relatively large protective device such as a bimetal, a PTC device, etc., in the body of the electric motor 20 to detect the temperature of the coil 20a. Thus, it is possible to downsize the electric motor 20.

In this embodiment, the operating switch 4 is formed from a swing switch that can be switched by two tiers to both of a first and a second sides. The operating switch 4 includes an opening switch, a closing switch and an automatic switch. Command signals for opening and closing the window glass 11 is outputted to the controller in accordance with operations of the operating switch 4 by the driver or the passenger.

When the operating switch 4 is switched by one tier to the first side, the opening switch is turned on, to output a normal opening command signal to the controller 31 so as to move the window glass 11 in a normal opening action in which the window glass 11 keeps moving toward the open position while the operating switch 4 is operated. When the operating switch 4 is switched by one tier to the second side, the closing switch is turned on, to output a normal closing command signal to the controller 31 so as to move the window glass 11 in a normal closing action in which the window glass 11 keeps moving toward the close position while the operating switch 4 is operated. In the following, the normal opening command signal and the normal closing command signal are referred to as a normal command signal.

The controller 31 drives the electric motor 20 via the driving circuit 32 while it receives the normal opening command signal from the operating switch 4, that is, while the operating switch 4 is operated, to move the window glass 11 in the normal opening action. The controller 31 drives the electric motor 20 the driving circuit 32 while it receives the normal closing command signal from the operating switch 4, that is, while the opening switch is operated, to move the window glass 11 in the normal closing action. In this embodiment, the window glass 11 keeps moving to the full close position or to the full open position by operating the operating switch 4 to generate the normal command signal continuously.

When the operating switch 4 is switched by two tiers to the first side, both of the opening switch and the automatic switch are turned on. Then, the operating switch 4 keeps outputting an automatic opening command signal to move the window glass 11 in an automatic opening action in which the window glass 11 keeps moving to the full open position even if the operating switch 4 stops being operated. When the operating switch 4 is switched by the two tiers to the second side, both of the closing switch and the automatic switch are turned on. Then, the operating switch 4 keeps outputting an automatic closing opening signal to move the window glass 11 in an automatic closing action in which the window glass 11 keeps moving to the full close position even if the operating switch 4 stops being operated.

When the controller 31 receives the automatic opening command signal from the operating switch 4, the controller 31 drives the electric motor 20 via the driving circuit 32, to move the window glass 11 in the automatic opening action to the full open position. When the controller 31 receives the automatic closing command signal from the operating switch 4, the controller 31 drives the electric motor 20 via the driving circuit 32, to move the window glass 11 in the automatic closing action to the full close position.

In this manner, when the controller 31 receives the automatic opening command signal or the automatic closing command signal (hereinafter referred to as "automatic command signal"), the controller 31 controls the driving circuit 32 to move the window glass 11 continuously for a certain time from its current position to the full open position or to the full close position.

Specifically, the controller 31 monitors the current position of the window glass 11 based on the pulse signals from the rotation detection device 25. Then, the controller 31 keeps outputting the control signal to the driving circuit 32 until a predetermined motor stuck time is elapsed after the window glass 11 has moved to the full open position or to the full close position.

The controller 31 monitors a presence or an absence of a pinching by the window glass 11 during closing actions (normal closing action and automatic closing action). That is, a pinching by the window glass 11 hinders an operation of the electric motor 20, to decrease the moving speed of the window glass 11 and to reduce the rotational speed (rotation period) of the electric motor 20. Accordingly, the controller 31 in this embodiment monitors the variation of the rotational speed of the electric motor 20 at all times.

In this embodiment, the controller 31 detects the pinching of the window glass 11 based on the variation of the rotational speed of the electric motor 20. Specifically, the controller 31 determines the presence of the pinching of the window glass 11 when the rotational speed of the electric motor 20 varies beyond a predetermined value during an upward movement of the window glass 11. That is, the controller 31 determines that a foreign matter is pinched between the upper end portion of the window glass 11 and the window frame when a speed reduction rate of the rotational speed is larger than a predetermined threshold value.

When a pinching of the window glass 11 is detected by the controller 31, the controller 31 reverses the operation of the electric motor 20 to open the window glass 11 to a predetermined middle position so as to release the foreign matter that is pinched by the window glass 11.

In the following is described a motor burning prevention function of the power window apparatus 1 according to this embodiment.

In the power window apparatus 1 according to this embodiment, an operation enable range A is specified in a range of the estimated temperature smaller than a first threshold temperature T1. An operation start disable range B is specified in a range of the estimated temperature larger than or equal to the first threshold temperature T1 and smaller than a second threshold temperature T2. An operation disable range C is specified in a range of the estimated temperature larger than the second threshold temperature T2. The second threshold temperature T2 is provided to prevent the electric motor 20 from being burnt by such an accidental failure that the operating switch 4 is stuck in an operational position.

When the estimated temperature calculated by the controller 31 is within the operation enable range A, it is estimated that the temperature of the coil 20a is within a safe temperature range with no possibility to be burnt. Accordingly, when the controller 31 receives the automatic command signal or the normal command signal, the controller 31 sends the control signals to the driving circuit 32 to supply electric power to the electric motor 20 in accordance with the command signal.

When the estimated temperature calculated by the controller 31 is within the operation disable range C, it is estimated that the coil 20a can be burnt. Accordingly, when the controller 31 receives the automatic command signal or the normal command signal, the controller 31 does not send the control signal to the driving circuit 32. In case the window glass 11 is already in the automatic opening action or the automatic closing action in accordance with the automatic command signal, the controller 31 stops sending the control signal to the driving circuit 32 so as to stop supplying electric power to the electric motor 20 forcedly.

When the estimated temperature calculated by the controller 31 is within the operation start disable range B, it is estimated that the temperature of the coil 20a can increase to the operation disable range C to burn the coil 20a during an set operation of the electric motor 20 once the operation of the electric motor 20 restarts of the electric motor 20 can cause a burning of the electric motor. Accordingly, when the controller 31 receives the automatic command signal or the normal command signal, the controller 31 does not send the control signal to the driving circuit 32, not to supply electric power to the electric motor 20. That is, when the estimated temperature is within the operation start disable range B and the electric motor 20 is stopped, the controller 31 disables the operation restart of the electric motor 20.

However, when the estimated temperature has reached the operation start disable range B while the electric motor 20 is in the automatic opening action or in the automatic closing action in accordance with the automatic command signal, the estimated temperature does not reach the operation disable range C in a short time. Accordingly, the controller 31 keeps outputting the control signal to the driving circuit 32 to continue the automatic opening action or the automatic closing action. The controller 31 in this embodiment serves as the operation restart disable means and the operation enable and disable means according to the present invention.

That is, when the estimated temperature has reached the operation start disable range B while the electric motor 20 is in the automatic opening action or in the automatic closing action, the controller 31 allows the driving circuit 32 to supply electric power to the electric motor 20 to complete the set operation to the full close position or to the full open position. The controller 31 also allows the set operation until the controller 31 stops receiving the normal command signal.

By this configuration, it is possible to prevent such an incommodity as to stop the closing action of the window glass 11 at the middle position in parking the vehicle, for example.

When the controller 31 has detected a pinching, the controller 31 automatically reverses the operation of the electric motor 20 to open the window glass 11 to a predetermined middle position. Even if the estimated temperature has reached the operation start disable range B when the pinching occurs, the controller 31 allows the driving circuit 32 to supply electric power to the electric motor 20 to move the window glass 11 to the predetermined middle position.

By this configuration, it is possible to prevent such an incommodity as to stop the window glass 11 to keep pinching a hand, etc.

If the operating switch 4 is operated when the controller 31 has completed the automatic reverse operation of the electric motor 20 to move the window glass 11 to the middle position, it is estimated that the driver or the passenger attempts to close the window glass 11 further than the middle position after removing the foreign matter pinched by the window glass 11. Thus, the controller 31 outputs the control signal to the driving circuit 32 to supply electric power to the electric motor 20. In this manner, the power window apparatus 1 according to this embodiment is configured so that the controller 31 can drive the electric motor 20 in accordance with the operation of the operating switch 4 on one time basis even if the estimated temperature is within the operation start disable range B when the controller 31 has completed the automatic reverse operation of the electric motor 20.

In the following is described an action of the power window apparatus 1, referring to FIG. 3, in which an abscissa indicates a time, and an ordinate indicates the estimated temperature of the coil 20a. In the following is described the action of the power window apparatus 1 in the automatic opening action or in the automatic closing action.

Figure 3:
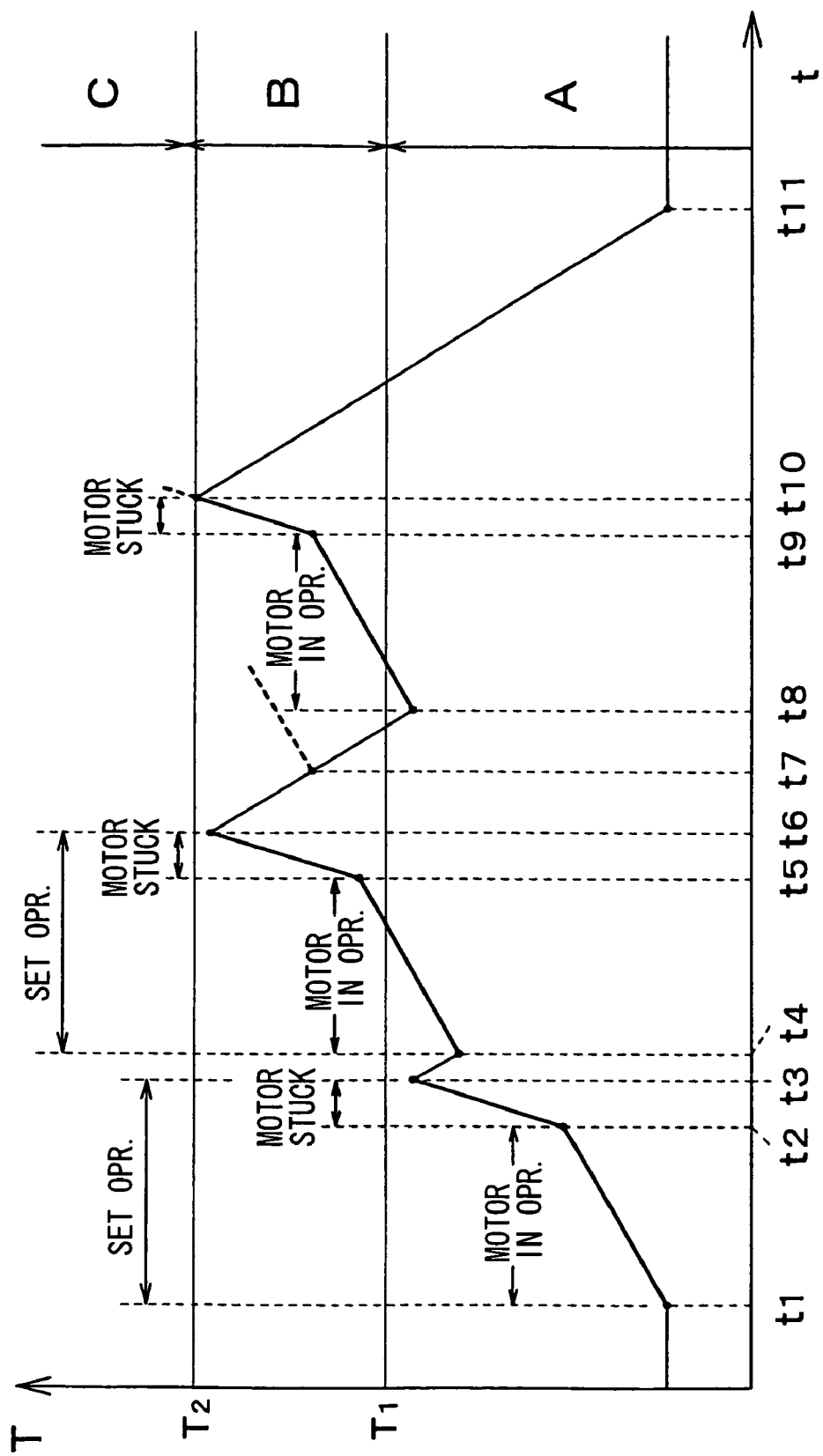
FIG. 3 is a graph schematically showing an estimated temperature of a coil of an electric motor of the power window apparatus in accordance with an operation of the power window apparatus.

In the operation example of the electric motor 20 shown in FIG. 3, at a time point t1, the window glass 11 is stopped at the full close position, and the automatic opening command signal is sent to the controller 31 by a switching operation of the operating switch 4. At the time point t1, the estimated temperature is equal to the atmospheric temperature and within the operation enable range A. Therefore, the controller 31 starts supplying electric power to the electric motor 20 in accordance with the switching operation. Accordingly, the electric motor 20 starts operating, and the window glass 11 reaches the full open position at a time point t2. The estimated temperature of the coil 20a gradually increases during the operation of the electric motor 20 between the time points t1 and t2, however, the estimated temperature of the coil 20a does not reach the first threshold temperature T1.

Between the time point t2 and a time point t3, the window glass 11 is kept in the motor stuck state. The temperature increasing pace is larger in the motor stuck state than in the normal operational state. In this embodiment, the power window apparatus 1 performs one set operation in a predetermined time between the time points t1 and t3. After the predetermined motor stuck time, the electric motor 20 is released from the motor stuck state and stops being energized, and then the estimated temperature starts decreasing at the time point t3. The energizing state here refers to: a normal operational state in which the electric motor 20 moves up and down the window glass 11 in a normal operational action; or a motor stuck state in which the window glass is immovably kept at the full open position or at the full close position by the window frame, etc., for a predetermined motor stuck time.

At a time point t4, the operating switch 4 is operated again to output the automatic closing command signal to the controller 31, the electric motor 20 performs the automatic closing action. During this automatic closing action, the estimated temperature exceeds the first threshold temperature T1 to reach the operation start disable range B. However, the controller 31 is in performing the automatic closing action, so that the controller 31 allows the driving circuit 32 to supply electric power to the electric motor 20 so as to keep moving the window glass 11. The window glass 11 reaches the full open position at a time point t5, and kept in the motor stuck state till a time point t6.

At the time point t4 when this set operation starts, the estimated temperature is within the operation enable range A, so that the controller 31 controls the driving circuit 32 to supply electric power to the electric motor 20. During this set operation, the estimated temperature reaches the operation start disable range B, however, the controller 31 keeps supplying electric power so as to complete this set operation.

At the time point t6, the electric motor 20 stops being energized, and the estimated temperature starts decreasing. At a time point t7, the operating switch 4 is operated, however, the controller 31 disables a restart of the electric motor 20. That is, the estimated temperature is within the operation start disable range B at the time point t7, so that the controller 31 disables the driving circuit 32 from supplying electric power to the electric motor 20.

At a time point t8, the estimated temperature has decreased below the operation enable range A. In this time, if the operating switch 4 is operated to output the automatic opening command signal, the controller 31 allows the driving circuit 32 to supply electric power to the electric motor 20, to restart the operation of the electric motor 20.

During this restart operation of the electric motor 20, the estimated temperature reaches the operation start disable range B, and then the window glass reaches the full open position at a time point t9. In this time, the estimated temperature is within the operation start disable range B. During the motor stuck state after the time point t9, the estimated temperature reaches the second threshold temperature T2 at a point t10. When the estimated temperature is within the operation disable range C, the controller 31 forcedly disables the driving circuit 32 from supplying electric power to the electric motor 20, to stop the electric motor 20 forcedly.

After the electric motor 20 is forcedly stopped, the estimated temperature gradually decreases, to reach an atmospheric temperature at a time point t11.

At the time point t8 when this set operation starts, the estimated temperature is within the operation enable range A, so that the controller 31 controls the driving circuit 32 to supply electric power to the electric motor 20. During this set operation, the estimated temperature reaches the operation start disable range B, however, the controller 31 keeps supplying electric power so as to complete this set operation.

However, the estimated temperature reaches the operation disable range C at the time point t10, and then the controller 31 forcedly disables the driving circuit 32 from supplying electric power to the electric motor 20 not to burn the motor coil 20a.

The above example is descried the set operations of the power window apparatus 1 in accordance with the automatic command signals from the operating switch 4 referring to FIG. 3. The power window apparatus 1 of this embodiment performs substantially in the same manner when the power window apparatus 1 performs set operations in accordance with the normal command signals.

In the following is described processes of one set operation of the controller 31, referring to FIGS. 4, 5.

In a step S1, the operating switch 4 is operated when the electric motor 20 is stopped, and the controller 31 receives the automatic command signal from the operating signal and predetermined signals such as temperature detection signals, the pulse signals, the applied voltage, etc., from the temperature sensor 33, the rotation detection device 25 and the driving circuit 32. In a step S2, the controller 31 calculates the estimated temperature of the coil 20a based on these signals.

In a step S3, the controller 31 determines whether the estimated temperature calculated in the step S2 is smaller than the first threshold temperature T1. If Yes in the step S3, that is, if the estimated temperature is smaller than the first threshold temperature T1, the estimated temperature is within the operation enable range A. Then, an allowance flag is turned on in a step S4 to allow the driving circuit 32 to supply electric power, and then the processes goes to a step S6.

If No in the step S3, that is, if the estimated temperature is equal to or larger than the first threshold temperature T1, the estimated temperature is not within the operation enable range A. Then, the allowance flag is turned off in a step S5 to prevent the driving circuit 32 from supplying the predetermined power supply, and the processes completes.

In a case that the operating switch 4 is operated for the first time after a completion of the reverse operation in accordance with the pinching detection, even if the estimated temperature is not smaller than the first threshold temperature T1 in the step S3, the processes go to the step S4.

In a step S6, the controller 31 receives the predetermined signals such as the temperature detection signals, the pulse signals, the applied voltage, etc., again from the temperature sensor 33, the rotation detection device 25 and the driving circuit 32. In a step S7, the controller 31 calculates the estimated temperature of the coil 20a based on these signals.

In a step S8, the controller 31 determines whether the estimated temperature calculated in the step S7 is equal to or larger than the second threshold temperature T2. If Yes in the step S8, that is, if the estimated temperature is smaller than the second threshold temperature T2, the estimated temperature is within the operation disable range C. Then, an allowance flag is turned off in a step S10 to prevent the driving circuit 32 from supplying a predetermined electric power, and then the processes completes.

If No in the step S8, that is, if the estimated temperature is smaller than the second threshold temperature T2, the estimated temperature is not within the operation disable range C. Then, the allowance flag is turned on in a step S9 to allow the driving circuit 32 to supply the predetermined power supply so as to continue the set operation, and the control signal is outputted to the driving circuit 32 to operate the electric motor 20 in a step S11.

In a step S12, the controller 31 determines whether the set operation is completed or not. In the automatic opening action or in the automatic closing action, the controller 31 determines whether the predetermined motor stuck time is elapsed after the window glass 11 has reached the full open position or the full close position, in accordance with the automatic command signal from the operating switch 4. In the normal opening action or in the normal closing action, the controller 31 determines whether the normal command signal is continuously inputted. When the normal command signal is continuously inputted, it is considered that the set operation has not completed.

If Yes in the step S12, that is, if the set operation completes, the processes reach completion.

If No in the step S12, that is, if the set operation has not completed, the processes go back again to the step S6. In each set operation in the automatic opening action or in the automatic closing action, a repeated processes of the step S6 through S12 moves the window glass 11 to the full open position or to the full close position and keeps the window glass 11 in the motor stuck state for a predetermined time. In the normal opening action or in the normal closing action, the processes of the step S6 through S12 are repeated while the normal command signal keeps inputted.

Figure 5:
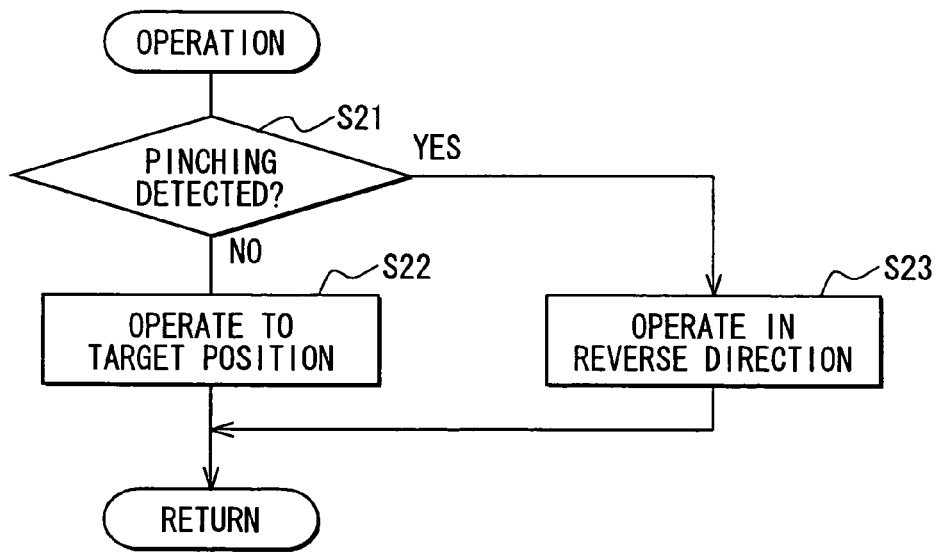
FIG. 5 is another flowchart showing a set control process by the operation controller of the motor control apparatus according to the embodiment.
Figure 4:
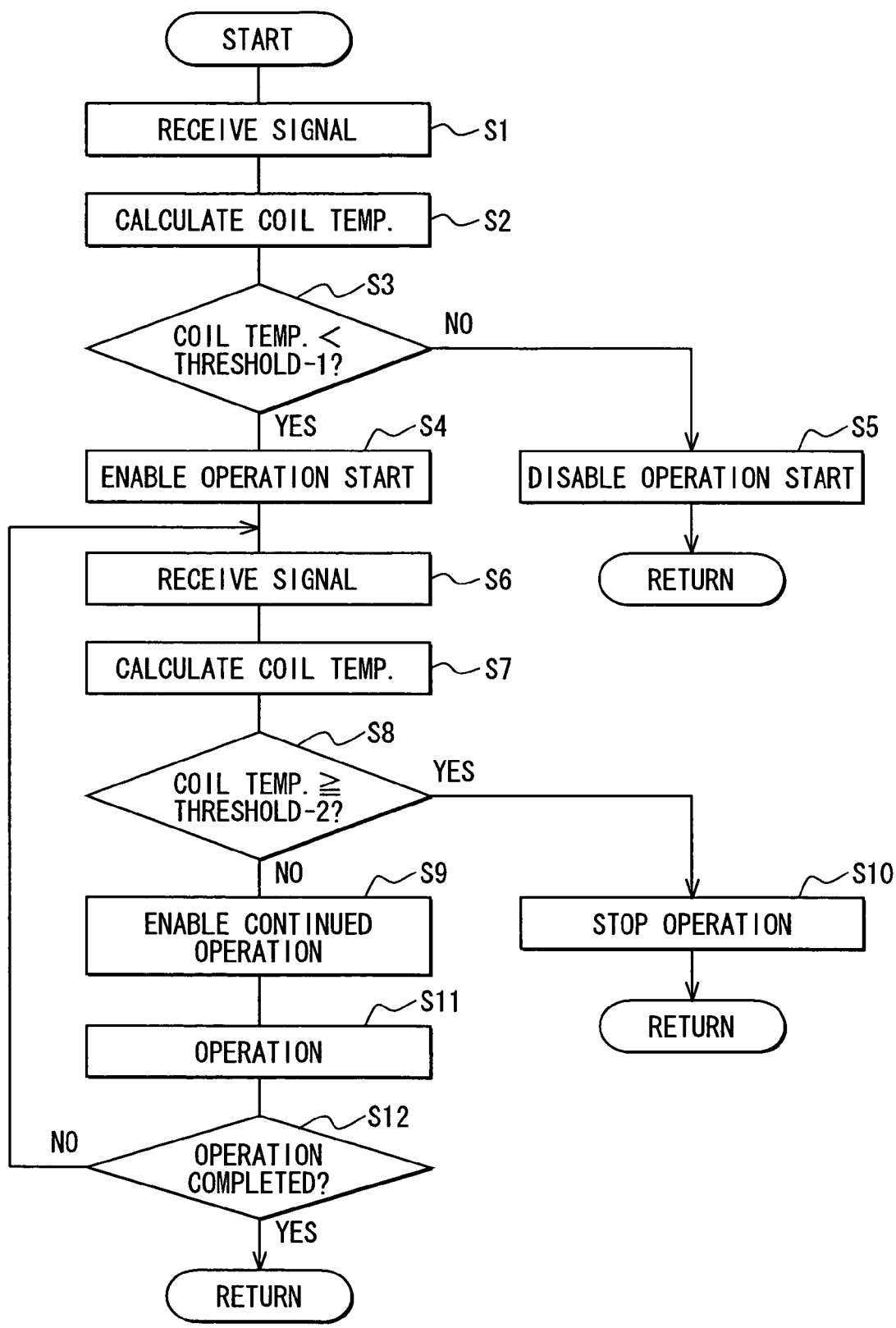
FIG. 4 is a flowchart showing a set control process by an operation controller of the motor control apparatus according to the embodiment.

In the operation of the electric motor 20 in the step S11 of FIG. 4, the controller 31 determines a presence or an absence of a pinching in a step S21 in FIG. 5. If Yes in the step S21, that is, if the controller 31 detects a pinching, the controller 31 sets a target position to the middle position, and makes the driving circuit 32 supply electric power to the electric motor 20 in a reverse direction in a step S23, and then the processes return to the step S12. In the step S23, the controller 31 compares a current position of the window glass 11, which is calculated based on the pulse signals from the rotation detection device 25, and the target position. If the current position has not reached the target position, the controller 31 sends a control signal to the driving circuit 32 to keep supplying electric power to the electric motor 20.

If No in the step S21, that is, if the controller 31 does not detect any pinching, the controller 31 sets the target position adequately to the full open position or to the full close position, and makes the driving circuit 32 supply electric power to the electric motor 20 to move the window glass 11 to the target position, and then the processes return to the step S12. In the step S22, the controller 31 compares the current position of the window glass 11, which is calculated based on the pulse signals from the rotation detection device 25, and the target position. If the current position has not reached the target position, the driving circuit 32 sends a control signal to the driving circuit 32 to keep supplying electric power to the electric motor 20. If the current position has reached the full open position or the full close position, the controller 31 sends the control signal to the driving circuit 32 to keep supplying electric power to the electric motor 20 until the predetermined motor stuck time is elapsed after the window glass 11 has reached the full open position or the full close position.

In the above-described embodiment is described an example to apply the motor control apparatus according to a present invention is applied to the power window apparatus 1. The present invention is not limited to this example, and is applicable to various apparatus in which a motor moves a moving member such as a door member, a curtain, etc. for a certain time to perform a continuous set operation to open and close the moving member.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor control apparatus for controlling an operation of an electric motor, comprising:
   a motor driver that provides electrical power to the motor;
   an operational temperature estimator that estimates an estimated temperature of the electric motor; and
   an operational controller that controls the motor driver for operation of the electric motor,
   wherein the operation controller prohibits the motor driver from providing the electrical power to the electric motor when the estimated temperature is within a motor restart prohibition range when the electric motor is stopped,
   wherein the operational controller allows the motor driver to continue to provide the electrical power to the electric motor when the estimated temperature is within the motor restart prohibition range until completion of a set operation of the electric motor when the electric motor is performing the set operation that has a predetermined completion condition, and
   wherein the operational controller controls the motor driver to forcedly stop a supply of the electrical power to the electric motor when the estimated temperature is within a motor operation prohibition range,
   wherein the motor operation prohibition range has a higher temperature range relative to the motor restart prohibition range.

2. The motor control apparatus according to claim 1, wherein the operation controller allows the operation of the electric motor while the estimated temperature is within a motor operation enable range that has a lower temperature range relative to the motor operation restart prohibition range.

3. The motor control apparatus according to claim 1, wherein the operation controller reverses the operation of the electric motor from an initial direction to a reverse direction without prohibiting the operation of the electric motor in the reverse direction even when the estimated temperature is within the motor operation restart prohibition range when the operation of the electric motor in the initial direction is hindered.

4. The motor control apparatus according to claim 1, wherein the operational temperature estimator estimates the estimated temperature by using an operational condition of the electric motor and an ambient temperature in a proximity of the electric motor.

5. The motor control apparatus of claim 1:
   wherein an operational temperature range is provided that is lower than the motor restart prohibition range for securing safe operation of the motor without a coil of the motor being damaged, and
   wherein the operational controller allows the operation of the motor under control of one of an automatic command signal or a normal command signal when the estimated temperature is in the operational range.

6. A method for controlling an operation of an electric motor, comprising:
   estimating an estimated temperature of the electric motor;
   determining whether the estimated temperature falls within a first temperature range, a second temperature range, or a third temperature range;
   instructing a motor driver to provide electrical power to the electric motor until completion of a set operation when the estimated temperature falls within the second temperature range, and the electric motor is currently operating;
   prohibiting the motor driver from providing the electrical power to the electric motor when the estimated temperature is within the second temperature range and the electric motor is stopped,
   controlling the motor driver to forcedly stop a supply of the electrical power to the electric motor when the estimated temperature is within the third temperature range,
   wherein the first, second, and third temperature ranges do not overlap, and
   wherein the first temperature range is lower than the second temperature range, and the second temperature range is lower than the third temperature range.

7. The method of claim 6, further comprising instructing a motor driver to provide electrical power to the electric motor when the estimated temperature falls within the first temperature range.

8. The method of claim 6, further comprising
   determining whether the operation of the electric motor in an initial direction is hindered; and
   reversing operation of the electric motor from the initial direction to a reverse direction without prohibiting the operation of the electric motor in the reverse direction when the estimated temperature is within the second temperature range when the operation of the electric motor in the initial direction is hindered.

9. The method of claim 6, wherein the estimating of the estimated temperature of the electric motor is performed using an operational condition of the electric motor and an ambient temperature in a proximity of the electric motor.

10. The A method for controlling an operation of an electric motor, of claim 6, further comprising:
    allowing an operation of the electric motor under control of an automatic command signal or a normal command signal when the estimated temperature is within the first temperature range.

11. The A method for controlling an operation of an electric motor, of claim 10, wherein the first temperature range allows an operation of the electric motor without danger of a motor coil in the electric motor being damaged by heat.

* * * * *